United States Patent
Leusenkamp et al.

(10) Patent No.: US 9,455,104 B1
(45) Date of Patent: Sep. 27, 2016

(54) VACUUM INTERRUPTER, RETAINING CLIP THEREFOR AND ASSOCIATED METHOD

(71) Applicant: EATON CORPORATION, Cleveland, OH (US)

(72) Inventors: Martin Bernardus Johannes Leusenkamp, Suzhou (CN); Jun Yan, Suzhou (CN); Yucheng Li, Suzhou (CN)

(73) Assignee: EATON CORPORATION, Cleveland, OH (US)

( * ) Notice: Subject to any disclaimer, the term of this patent is extended or adjusted under 35 U.S.C. 154(b) by 0 days.

(21) Appl. No.: 14/684,595

(22) Filed: Apr. 13, 2015

(51) Int. Cl.
- *H01H 33/662* (2006.01)
- *F16B 2/24* (2006.01)
- *H01H 11/00* (2006.01)

(52) U.S. Cl.
CPC ........ *H01H 33/66261* (2013.01); *F16B 2/243* (2013.01); *H01H 11/00* (2013.01); *H01H 2033/66276* (2013.01)

(58) Field of Classification Search
CPC .............. H01H 33/66261; H01H 33/664; H01H 2033/6623; H01H 2033/66276; H01H 2033/66292; H01H 2033/66284
See application file for complete search history.

(56) References Cited

U.S. PATENT DOCUMENTS

| | | | |
|---|---|---|---|
| 3,048,681 A | 8/1962 | Polinko, Jr. | |
| 4,079,217 A * | 3/1978 | Oeschger | H01H 33/66 218/135 |
| 4,665,287 A * | 5/1987 | Sofianek | H01H 33/66261 218/136 |
| 4,733,456 A | 3/1988 | Sofianek et al. | |
| 4,896,008 A * | 1/1990 | Aoki | H01H 33/66207 218/134 |
| 5,189,270 A * | 2/1993 | Matumoto | H01H 33/66261 218/130 |
| 5,687,472 A * | 11/1997 | Honma | H01H 33/66 218/136 |
| 5,726,407 A * | 3/1998 | Okutomi | H01H 1/0203 218/130 |
| 5,777,287 A * | 7/1998 | Mayo | H01H 33/6642 200/275 |
| 6,417,473 B1 | 7/2002 | Mayo et al. | |
| 9,335,378 B2 * | 5/2016 | Ledbetter | G01R 31/327 |
| 2002/0043514 A1 * | 4/2002 | Kim, II | H01H 33/6644 218/118 |
| 2002/0153353 A1 * | 10/2002 | Inagaki | H01H 3/001 218/118 |
| 2005/0194359 A1 * | 9/2005 | Masnada | H01H 33/66261 218/118 |

FOREIGN PATENT DOCUMENTS

JP        S55-32301 A     3/1980

OTHER PUBLICATIONS

European Patent Office, "International Search Report and Written Opinion" (for corresponding application PCT/US2016/025133), Jun. 15, 2015, 11 pages.

* cited by examiner

*Primary Examiner* — Truc Nguyen
(74) *Attorney, Agent, or Firm* — Eckert Seamans Cherin & Mellott, LLC; John P. Powers; Grant E. Coffield (57) ABSTRACT

A retaining clip is for a vacuum interrupter. The vacuum interrupter includes a tubular ceramic member, a tubular shield member, and a pair of separable contacts. The shield member is disposed internal with respect to the ceramic member. The separable contacts are disposed internal with respect to the shield member. The retaining clip comprises: a base mounted on the ceramic member; and at least one flexible arm extending from the base. The flexible arm engages the shield member in order to retain the shield member on the ceramic member.

17 Claims, 6 Drawing Sheets

VACUUM INTERRUPTER, RETAINING CLIP THEREFOR AND ASSOCIATED METHOD

BACKGROUND

1. Field

The disclosed concept pertains generally to vacuum interrupters. The disclosed concept also pertains to retaining clips for vacuum interrupters. The disclosed concept further pertains to methods of assembling vacuum interrupters.

2. Background Information

Vacuum interrupters are often employed as the switching devices in power circuit breakers. Vacuum interrupters generally include separable electrical contacts disposed within an insulated and hermetically sealed vacuum chamber. The vacuum chamber typically includes, for example and without limitation, a number of ceramic sections (e.g., without limitation, a number of tubular ceramic portions) for electrical insulation capped by a number of end members (e.g., without limitation, metal components, such as metal end plates; end caps; seal cups) to form an envelope in which a partial vacuum may be drawn. The ceramic section is typically cylindrical; however, other suitable cross-sectional shapes may be used.

When the separable contacts are opened with current flowing through the vacuum interrupter, a metal-vapor arc is struck between the contact surfaces. This arc continues until the current is interrupted, typically as the current goes through a zero crossing. In order to prevent the metal vapor from condensing on the ceramic insulator, a generally cylindrical metal vapor shield is typically provided between the contacts and the ceramic inside the vacuum envelope.

Known vacuum interrupters may include any number of ceramic insulators coupled together. Employing two ceramic insulators requires burdensome methods to align the ceramic insulators in the vacuum interrupter, resulting in significantly higher manufacturing costs. Furthermore, a typical single ceramic insulator has a groove inside the ceramic insulator into which an insert is placed to support the vapor shield. However, machining the groove results in micro cracks in the ceramic insulator, which in turn leads to weak spots in terms of insulation. Another method of assembling a vacuum interrupter involves employing a protrusion in the center of the ceramic insulator and deforming the vapor shield around the protrusion. Known drawbacks of such a configuration are that the vapor shield is loose, and also that complex tooling is required for assembly. An additional design involves metalizing one or more of the sides of an internal protrusion and brazing the vapor shield to the protrusion. Such a configuration is significantly expensive to manufacture.

There is, therefore, room for improvement in vacuum interrupters and in retaining clips therefor.

There is also room for improvement in methods of assembling vacuum interrupters.

SUMMARY

These needs and others are met by embodiments of the disclosed concept, which are directed to a vacuum interrupter, retaining clip therefor and associated method which among other benefits, quickly and inexpensively allows a shield member to be reliably retained on a ceramic member.

In accordance with one aspect of the disclosed concept, a retaining clip for a vacuum interrupter is provided. The vacuum interrupter includes a tubular ceramic member, a tubular shield member, and a pair of separable contacts. The shield member is disposed internal with respect to the ceramic member. The separable contacts are disposed internal with respect to the shield member. The retaining clip comprises: a base structured to be mounted on the ceramic member; and at least one flexible arm extending from the base. The flexible arm engages the shield member in order to retain the shield member on the ceramic member.

As another aspect of the disclosed concept, a vacuum interrupter comprises: a tubular ceramic member; a tubular shield member disposed internal with respect to the ceramic member; a pair of separable contacts disposed internal with respect to the shield member; and a retaining clip comprising: a base mounted on the ceramic member, and at least one flexible arm extending from the base. The flexible arm engages the shield member in order to retain the shield member on the ceramic member.

As another aspect of the disclosed concept, a method of assembling a vacuum interrupter is provided. The vacuum interrupter includes a tubular ceramic member, a tubular shield member, a pair of separable contacts, and a retaining clip. The retaining clip includes a base and at least one flexible arm extending from the base. The method comprises the steps of: providing the ceramic member; inserting the retaining clip on the ceramic member; disposing the shield member internal with respect to the ceramic member; pushing the shield member into the retaining clip in order to retain the shield member on the ceramic member, the base being mounted on the ceramic member, the flexible arm engaging the shield member; and disposing the separable contacts internal with respect to the shield member.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

It is to be understood that the specific elements illustrated in the drawings and described in the following specification are simply exemplary embodiments of the disclosed concept. Therefore, specific orientations and other physical characteristics related to the embodiments disclosed herein are not to be considered limiting with respect to the scope of the disclosed concept. For example and without limitation, a first component that is oriented "above" a second component in an illustrated embodiment, may also be oriented "below" or "side-by-side" the second component in another embodiment.

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

As employed herein, the term "external" shall mean that one component, such as a retaining clip, does not extend through a surface of another component, such as the internal cylindrical surface of a ceramic member or any surface of an internal protrusion of the ceramic member. Furthermore, a component, such as a retaining clip, may be surrounded by another component, such as a wall portion or protrusion of a ceramic member, and still be located entirely "external" the wall portion and the protrusion of the ceramic member.

Figure 1:
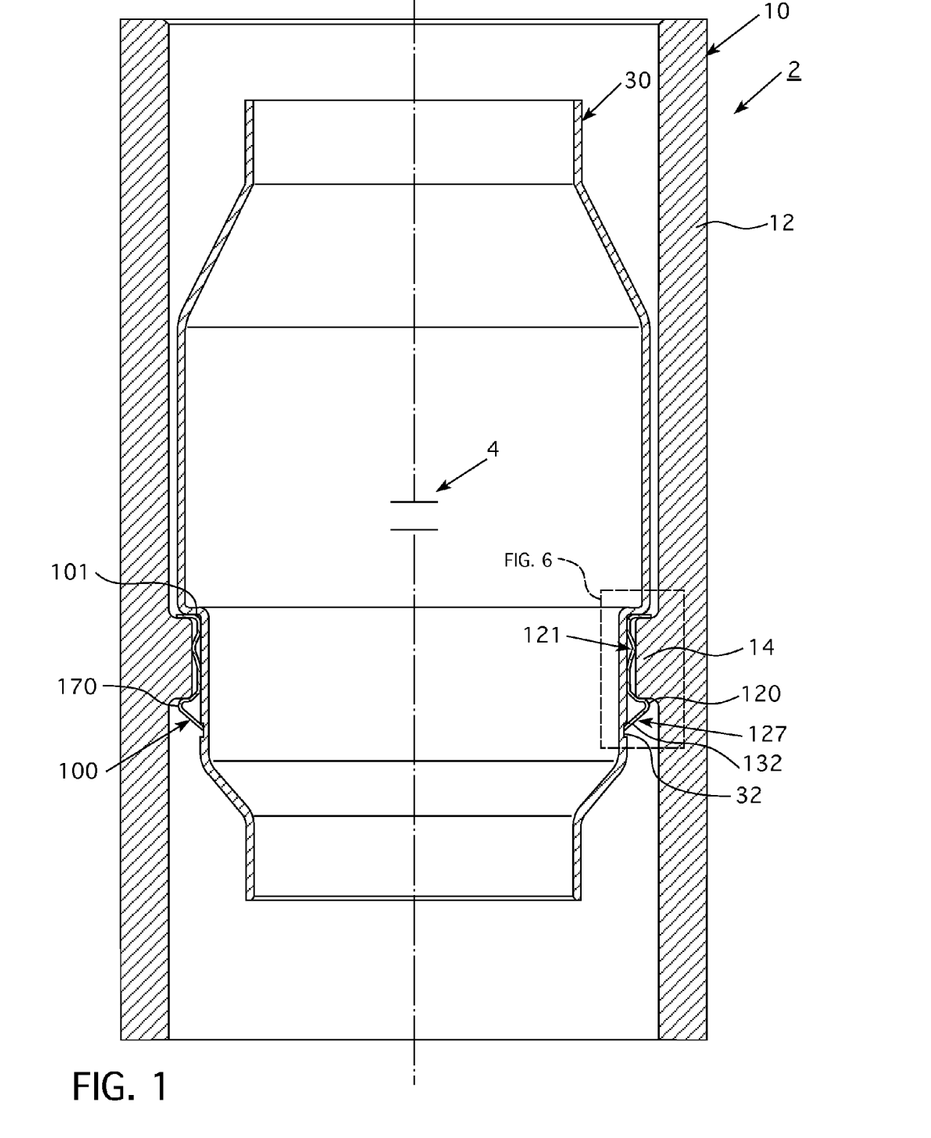
FIG. 1 is a simplified section view of a vacuum interrupter, shown with the shield member retained on the ceramic member, in accordance with an embodiment of the disclosed concept.

FIG. 1 shows a vacuum interrupter 2 (shown in simplified form) in accordance with a non-limiting embodiment of the disclosed concept. The example vacuum interrupter 2 includes a pair of separable contacts 4 (shown in simplified form), a single tubular ceramic member 10, a tubular shield member 30, and a retaining clip 100. The shield member 30 is located internal with respect to the ceramic member 10. The separable contacts 4 are located internal with respect to the shield member 30. The ceramic member 10 provides electrical insulation for the vacuum interrupter 2 and also helps to maintain a vacuum. In operation, when the separable contacts 4 are opened with current flowing, the shield member 30 prevents the metal vapor (i.e., metal vapor struck between the separable contacts 4) from depositing on the ceramic member 10.

The retaining clip 100 is located between the ceramic member 10 and the shield member 30. As will be discussed in greater detail hereinbelow, the retaining clip 100 advantageously allows the shield member 30 to be retained on the ceramic member 10. Thus, when the vacuum interrupter 2 is in different orientations (e.g., when the vacuum interrupter 2 is employed in different electrical switching apparatus (not shown)), the shield member 30 is reliably retained on the ceramic member 10. Furthermore, as shown, the retaining clip 100 is able to retain the shield member 30 on the ceramic member 10 without employing grooves in the ceramic member 10. Accordingly, because there are no grooves (i.e., and thus no weak spots due to micro cracks associated with machining such grooves), insulation is advantageously improved.

Figure 2:
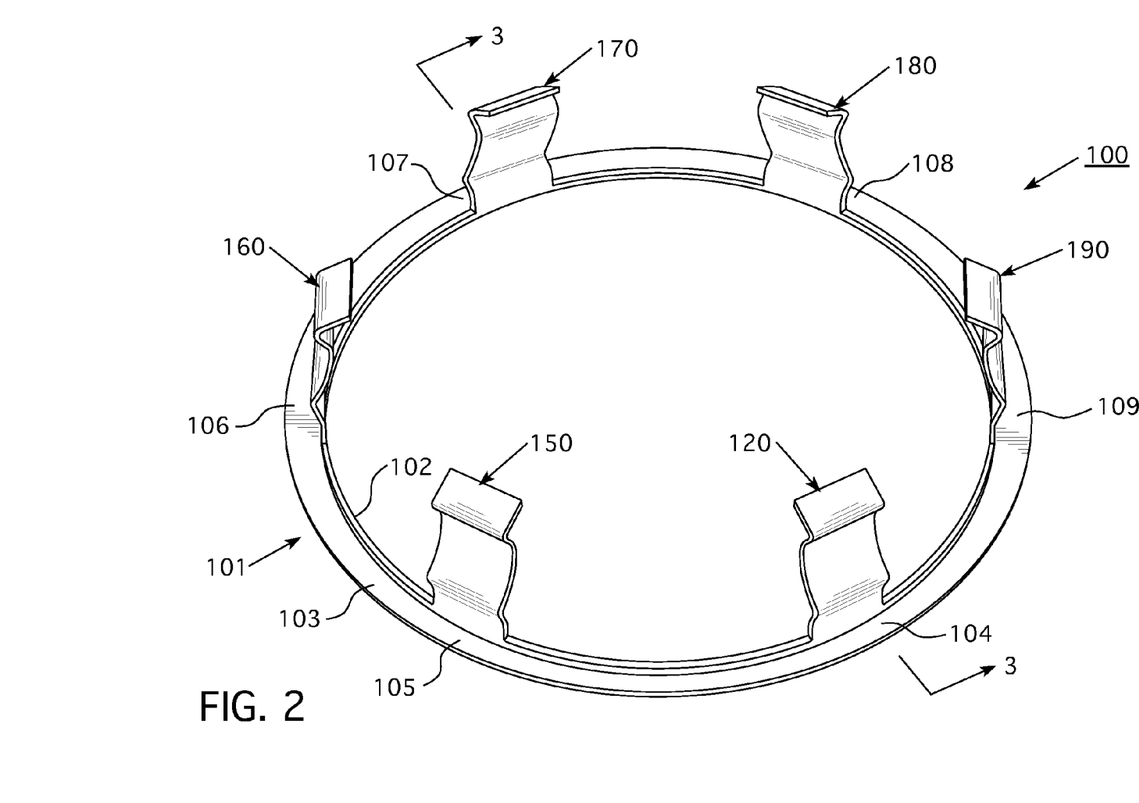
FIG. 2 is an isometric view of a retaining clip for the vacuum interrupter of FIG. 1.

FIG. 2 shows an isometric view of the retaining clip 100. The retaining clip 100 includes an annular-shaped base 101 and a number of flexible arms 120,150,160,170,180,190 (six are shown) extending from the base 101. The base 101 has an annular-shaped cylindrical portion 102 and an annular-shaped planar portion 103 extending outwardly from the cylindrical portion 102. As shown, each of the flexible arms 120,150,160,170,180,190 is spaced from each other. Preferably, but without limitation, each of the flexible arms 120,150,160,170,180,190 is evenly spaced with respect to each other. More specifically, the base 101 has a plurality of locations 104,105,106,107,108,109 that are preferably evenly spaced with respect to each other. In other words, the distance from the location 104 to the location 109 is generally the same as the distance from the location 104 to the location 105. Since each of the flexible arms 120,150,160, 170,180,190 extends from a corresponding one of the locations 104,105,106,107,108,109, the flexible arms 120,150, 160,170,180,190 are evenly spaced with respect to each other. Thus, the distance from the flexible arm 120 to the flexible arm 190 is generally the same as the distance from the flexible arm 120 to the flexible arm 150.

As a result, the shield member 30 is evenly supported by the retaining clip 100. More specifically, and with reference to FIG. 1, the shield member 30 extends through the base 101 of the retaining clip 100. The flexible arms 120,150, 160,170,180,190 (FIG. 2) engage the shield member 30 in order to retain the shield member 30 on the ceramic member 10. As shown in FIG. 1, the flexible arm 120 partially supports the shield member 30. Similarly, the flexible arm 170 partially supports the shield member 30. It will be appreciated that the flexible arms 150,160,180,190 (FIG. 2) likewise partially support the shield member 30. Because the flexible arms 120,150,160,170,180,190 are evenly spaced with respect to each other, the shield member 30 is advantageously able to be evenly supported on the retaining clip 100.

Figure 3:
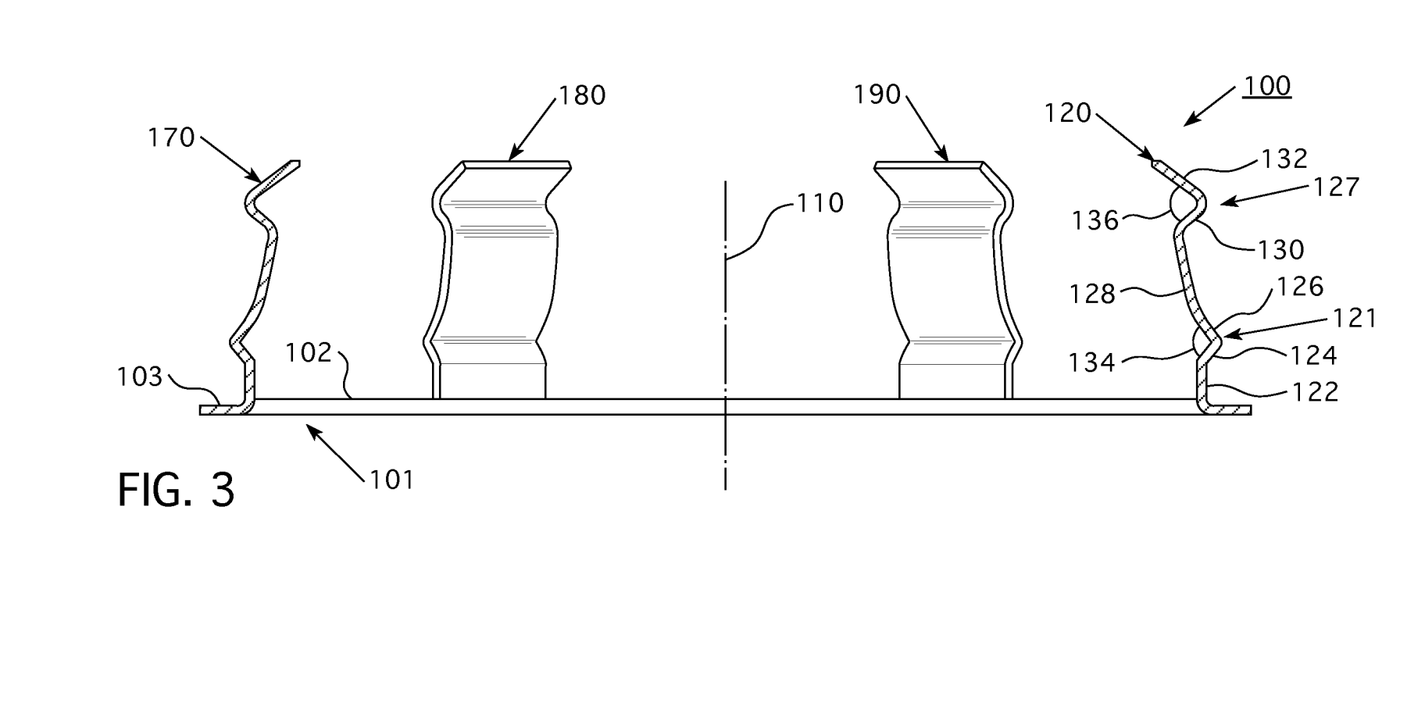
FIG. 3 is a section view of the retaining clip, taken along line 3-3 of FIG. 2.

Referring to FIG. 3, the flexible arm 120 includes a bulge portion 121 and a claw portion 127. As shown, the base 101 has a central axis 110. Each of the bulge portion 121 and the claw portion 127 is oriented concavely (i.e., faces toward, is bent inwardly) with respect to the central axis 110. As will be discussed in greater detail below, when the shield member 30 is assembled in the vacuum interrupter 2, each of the bulge portion 121 and the claw portion 127 together operate to retain the shield member 30 on the ceramic member 10.

Continuing to refer to FIG. 3, the claw portion 127 is spaced from the base 101. The bulge portion 121 connects the claw portion 127 to the base 101. The bulge portion 121 includes a number of legs 122,124,126. The claw portion 127 includes a number of legs 128,130,132. The leg 122 extends from the base 101. The leg 124 connects the leg 122 to the leg 126. The leg 126 connects the leg 124 to the leg 128. The leg 128 connects the leg 126 to the leg 130. The leg 130 connects the leg 128 to the leg 132. The leg 124 is at an angle 134 with respect to the leg 126. The leg 130 is at an angle 136 with respect to the leg 132. The angle 136 is preferably less than 90 degrees. As shown, the angle 134 is larger than the angle 136. However, it is within the scope of the disclosed concept for a flexible arm (not shown) to have any suitable alternative size and/or angles between leg members (not shown) in order to perform the desired function of retaining the shield member 30 on the ceramic member 10. It will be appreciated that each of the other flexible arms 150 (FIG. 2),160 (FIG. 2),170,180,190 is preferably configured substantially the same as the flexible arm 120.

Figure 4:
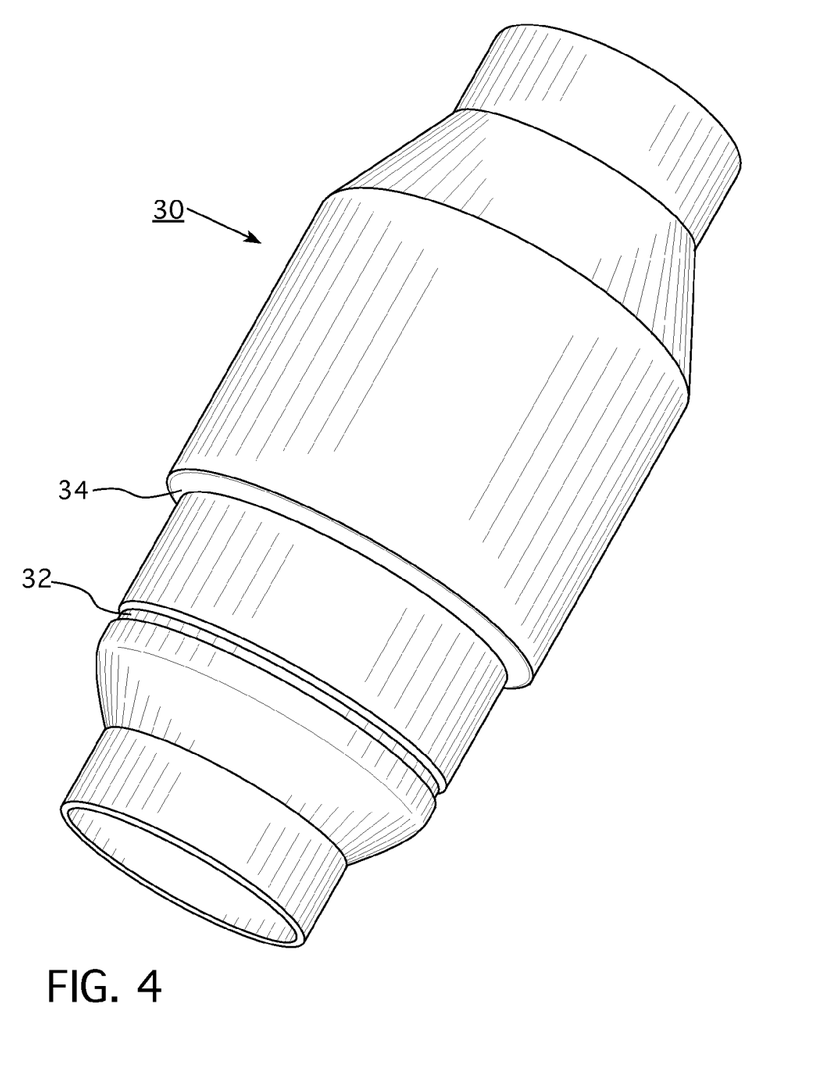
FIG. 4 is an isometric view of the shield member for the vacuum interrupter of FIG. 1.
Figure 5:
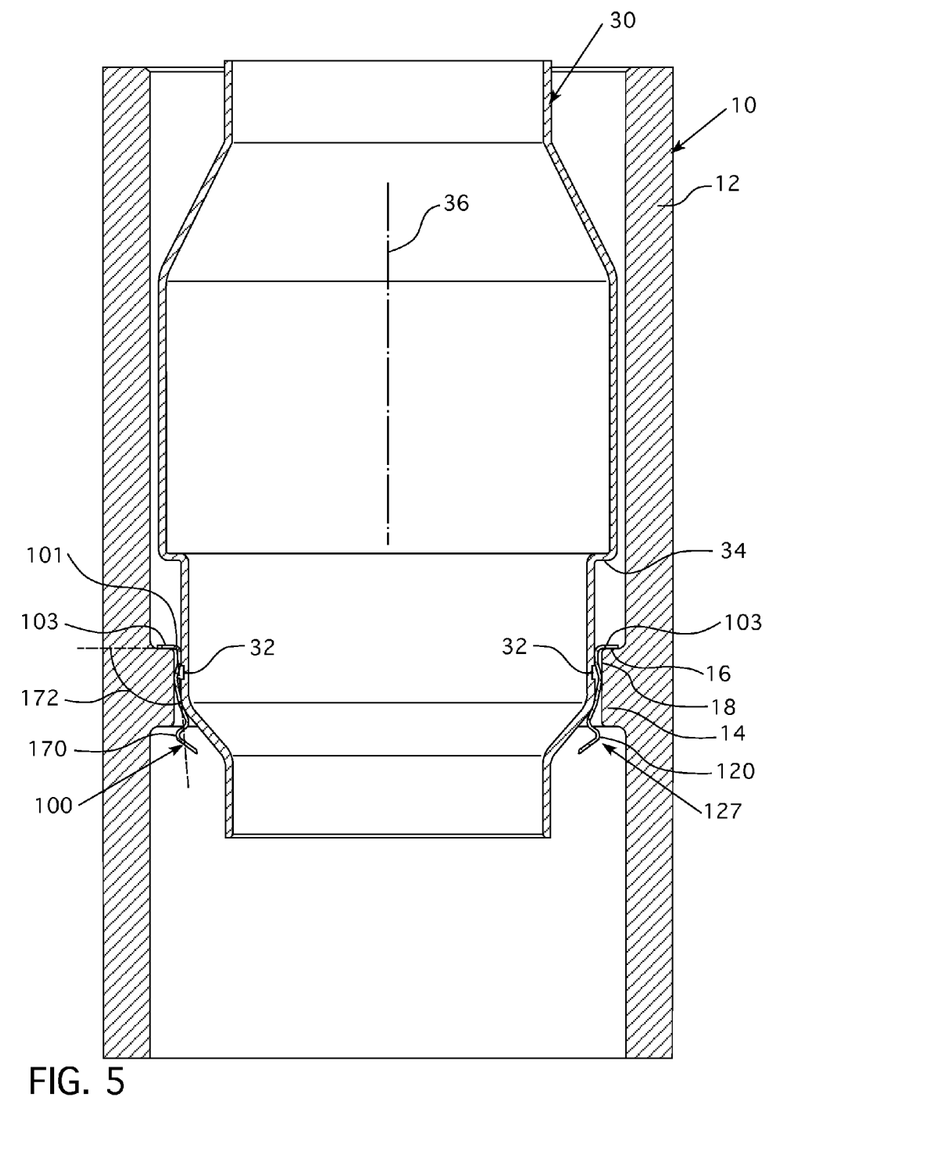
FIG. 5 is a simplified section view of the vacuum interrupter of FIG. 1, shown before the shield member is retained on the ceramic member, in accordance with an embodiment of the disclosed concept.

FIG. 4 shows an isometric view of the shield member 30. As shown, the shield member 30 has an annular groove 32 and an annular-shaped ledge 34. Referring to FIG. 5, the ceramic member 10 includes a wall portion 12 and an annular-shaped protrusion 14 extending inwardly from the wall portion 12. It will be appreciated that a method of assembling the vacuum interrupter 2 includes the steps of providing the ceramic member 10, mounting the retaining clip 100 on the ceramic member 10, and disposing the shield member 30 internal with respect to the ceramic member 10. Next, the method includes the steps of pushing the shield member 30 into the retaining clip 100 and disposing the separable contacts 4 (FIG. 1) internal with respect to the shield member 30. The shield member 30 is pushed into the retaining clip 100 in order to retain the shield member 30 on the ceramic member 10.

The retaining clip 100 is inserted first on the ceramic member 10. Specifically, the base 101 of the retaining clip 100 is overlaid on the protrusion 14 in order to be mounted on the ceramic member 10. The shield member 30 is pushed partially through the base 101 until the ledge 34 engages the planar portion 103. As shown, before the shield member 30 has been pushed onto the retaining clip 100, the flexible arms 120,170 (and the flexible arms 150,160,180, 190, FIG. 2) substantially extend inwardly with respect to the base 101. In this position, the flexible arm 170 extends at an angle 172 of between 100 degrees and 110 degrees with respect to the planar portion 103 of the base 101.

Continuing to refer to FIG. 5, during assembly, the shield member 30 causes the flexible arms 120,170 (and the flexible arms 150,160,180,190, FIG. 2) to move. More specifically, the shield member 30 has a central axis 36. When the shield member 30 is pushed into the retaining clip 100, the flexible arms 120,170 (and the flexible arms 150, 160,180,190, shown in FIG. 2) move away from the central axis 36.

Figure 6:
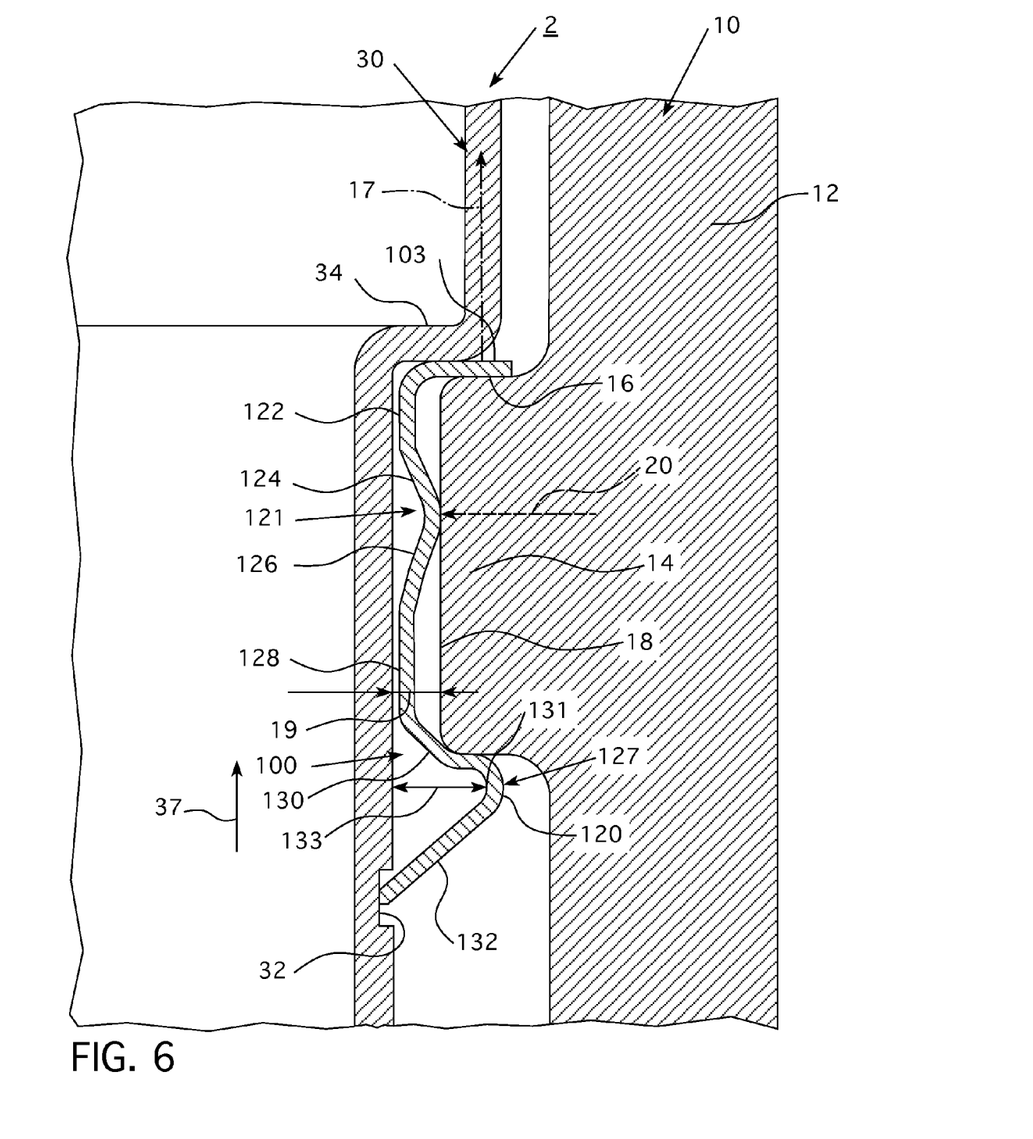
FIG. 6 is an enlarged view of a portion of the vacuum interrupter of FIG. 1.

To illustrate, reference is made to FIG. 6, which shows an enlarged view of the assembled vacuum interrupter 2. As shown, the protrusion 14 has a first surface 16 and a second surface 18 generally perpendicular to the first surface 16. The first surface 16 faces in a direction 17 generally parallel to the wall portion 12. The planar portion 103 is generally flush with the first surface 16 and is also generally flush with the ledge 34. It will be appreciated that the cylindrical portion 102 (FIG. 2 and FIG. 3) of the retaining clip 100 is generally parallel with the second surface 18 of the protrusion 14. Furthermore, the planar portion 103 is generally parallel to the ledge 34 and is located between the first surface 16 and the ledge 34.

In the position illustrated in FIG. 6, the flexible arm 120 has been pushed by the shield member 30 such that it is able to retain the shield member 30 on the ceramic member 10. As shown, the flexible arm 120 is located between the protrusion 14 and the shield member 30. More specifically, the legs 122,128 are each generally parallel with the second surface 18 of the protrusion 14. The leg 124 extends from the leg 122 away from the shield member 30. The leg 126 extends from the leg 124 toward the shield member 30. The leg 130 extends from the leg 128 away from the shield member 30. The leg 132 extends from the leg 130 toward the shield member. This configuration of the bulge portion 121 and the claw portion 127 advantageously helps retain the shield member 30 on the ceramic member 10.

Additionally, the retaining clip 100 is retained on the protrusion 14 at three locations of contact, advantageously resulting in a relatively secure connection between the retaining clip 100 and the protrusion 14. As shown, the planar portion 103 is generally flush with the top (with respect to the orientation of FIG. 6) of the protrusion 14, the leg 124 and/or the leg 126 engage(s) the protrusion 14 in the middle (with respect to the orientation of FIG. 6) of the protrusion 14, and the leg 130 and/or the leg 132 engage(s) the bottom (with respect to the orientation of FIG. 6) of the protrusion 14. In this manner, the retaining clip 100 advantageously provides a relatively secure structure on which the shield member 30 is retained.

As shown, the bulge portion 121 engages the second surface 18, which in turn exerts a force on the bulge portion 121 in a direction 20 perpendicular to the direction 17. Because the leg 132 is connected to the bulge portion 121, the force from the second surface 18 on the bulge portion 121 pushes the leg 132 into the shield member 30. More specifically, the leg 132 extends from the leg 130 partially into the groove 32 of the shield member 30. It will be appreciated that the respective legs of the other flexible arms 150,160,170,180,190 (FIG. 2) likewise partially extend into the groove 32 when the vacuum interrupter 2 is assembled. The relationship between the groove 32 and the leg 132 advantageously prevents the shield member 30 from moving in a direction 37. However, it will be appreciated that a suitable alternative vacuum interrupter (not shown) may employ flexible arms (not shown) that do not extend into, but rather are located on, a shield member (not shown).

Although the vacuum interrupter 2 has been described in association with the annular-shaped groove 32 and the annular-shaped ledge 34, it will be appreciated that the disclosed concept may employ any suitable alternative configuration in order to perform the desired function of retaining a shield member (not shown) on the retaining clip 100, and thus the protrusion 14. For example and without limitation, rather than employing the annular-shaped ledge 34, it is within the scope of the disclosed concept to employ any number of protrusions (not shown) extending outwardly from the body of a shield member (not shown) in order to perform the desired function of retaining the shield member (not shown) on the retaining clip 100. Additionally, rather than employing the annular-shaped groove 32, it is within the scope of the disclosed concept to employ slots and/or protrusions (not shown) for each of the flexible arms 120, 150,160,170,180,190 to extend into and/or onto. Furthermore, it is also within the scope of the disclosed concept to employ a brazing member (e.g., without limitation, a wire or a washer, not shown) and a cylindrical-shaped shield member (i.e., no grooves/slots and/or no ledge, not shown) that is brazed to the retaining clip 100 and the brazing member (not shown).

Because the leg 132 extends into the groove 32 and the legs 130,132 cannot be pulled in the direction 37, the shield member 30 cannot be pulled in the direction 37. The leg 132 extends into the groove 32 and exerts a force on the groove 32. Moreover, the legs 130,132 cannot be pulled in the direction 37 because the legs 130,132 do not fit between the shield member 30 and the protrusion 14 when the leg 132 extends into the groove 32, advantageously retaining the shield member 30 on the ceramic member 10. Stated differently, the leg 130 connects with the leg 132 at a junction 131. The junction 131 is spaced a distance 133 from the shield member 30. The distance 133 is greater than a distance 19 between the second surface 18 and the shield member 30. As a result, the shield member 30 is partially retained on the ceramic member 10 by the bulge portion 121 and the claw portion 127.

The shield member 30 is also partially retained on the ceramic member 10 by the ledge 34 of the shield member 30. Because the ledge 34 has a larger diameter than the inner diameter of the protrusion 14, the shield member 30 is not able to be pulled through the protrusion 14. In this manner, the shield member 30 is advantageously able to be retained on the ceramic member 10.

Because the flexible arms 120 (and the flexible arms 150,160,170,180,190 (FIG. 2)) and the ledge 34 together operate to retain the shield member 30 on the ceramic member 10, the vacuum interrupter 2 is advantageously able to be employed in different electrical switching apparatus (not shown). More specifically, when the vacuum interrupter 2 is assembled, the shield member 30 cannot be pulled in the direction 37 or in a direction opposite the direction 37. As a result, the vacuum interrupter 2 can be oriented in an electrical switching apparatus (not shown) in any orientation. For example and without limitation, the vacuum interrupter 2 may be employed with the ledge 34 above the planar portion 103 (as shown), with a ledge and planar portion side-by-side (not shown), or with a ledge below a planar portion (not shown).

Additionally, because the shield member 30 is able to be retained on the single ceramic member 10 without the need to machine a groove, weak spots in insulation associated with such grooves are significantly minimized. To illustrate, reference is made to FIG. 6, which shows the retaining clip 100 being located entirely external both each of the wall portion 12 and the protrusion 14. Stated differently, while the tubular ceramic member 10 surrounds the retaining clip 100, no portion of the retaining clip 100 extends into the wall portion 12 or the protrusion 14. Rather, the retaining clip 100 rests on the exterior of the protrusion 14. In other words, no portion of the retaining clip 100 extends through any portion of the first surface 16, the second surface 18, or the wall portion 12 (i.e., the internal cylindrical surface of the wall portion 12).

Accordingly, it will be appreciated that the disclosed concept provides for an improved (e.g., without limitation, quick and inexpensive to assemble, and reliably retained) vacuum interrupter 2, and retaining clip 100 therefor and associated method, which among other benefits, allows a shield member 30 to be retained on a single ceramic insulator 10 without employing a groove, advantageously improving insulation capabilities in the vacuum interrupter 2 while allowing the vacuum interrupter 2 to be employed in different electrical switching apparatus (not shown).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A retaining clip for a vacuum interrupter, said vacuum interrupter comprising a tubular ceramic member, a tubular shield member, and a pair of separable contacts, said shield member being disposed internal with respect to said ceramic member, said separable contacts being disposed internal with respect to said shield member, said retaining clip comprising:
   a base structured to be mounted on said ceramic member; and
   at least one flexible arm extending from said base,
   wherein said at least one flexible arm is structured to engage said shield member in order to retain said shield member on said ceramic member,
   wherein said base is annular-shaped; and wherein said at least one flexible arm is a plurality of flexible arms.

2. The retaining clip of claim 1 wherein each of said plurality of flexible arms extends from said base at a respective predetermined location; and wherein the predetermined locations are evenly spaced with respect to each other.

3. The retaining clip of claim 2 wherein said plurality of flexible arms comprises a first flexible arm, a second flexible arm, a third flexible arm, a fourth flexible arm, a fifth flexible arm, and a sixth flexible arm.

4. The retaining clip of claim 1 wherein said base has a central axis; wherein each of said plurality of flexible arms comprises a bulge portion and a claw portion; wherein the claw portion is spaced from said base and at least partially extends into said shield member in order to retain said shield member on said ceramic member; wherein the bulge portion connects the claw portion to said base; and wherein each of the claw portion and the bulge portion is oriented concavely with respect to the central axis.

5. The retaining clip of claim 4 wherein the bulge portion comprises a first leg, a second leg, and a third leg; wherein the claw portion comprises a fourth leg, a fifth leg, and a sixth leg; wherein the first leg extends from said base; wherein the second leg connects the first leg to the third leg; wherein the third leg connects the second leg to the fourth leg; wherein the fourth leg connects the third leg to the fifth leg; wherein the fifth leg connects the fourth leg to the sixth leg; wherein the sixth leg at least partially extends into said shield member in order to retain said shield member on said ceramic member; wherein the second leg is at a first angle with respect to the third leg; wherein the fifth leg is at a second angle with respect to the sixth leg; wherein the second angle is less than 90 degrees; and wherein the first angle is larger than the second angle.

6. A vacuum interrupter comprising:
   a tubular ceramic member;
   a tubular shield member disposed internal with respect to said ceramic member;
   a pair of separable contacts disposed internal with respect to said shield member; and
   a retaining clip comprising:
      a base mounted on said ceramic member, and
      at least one flexible arm extending from said base,
   wherein said at least one flexible arm engages said shield member in order to retain said shield member on said ceramic member,
   wherein said ceramic member comprises a wall portion and a protrusion extending inwardly from the wall portion; and wherein said at least one flexible arm is at least partially disposed between the protrusion and said shield member.

7. The vacuum interrupter of claim 6 wherein said retaining clip is disposed entirely external each of the wall portion and the protrusion.

8. The vacuum interrupter of claim 6 wherein the protrusion is annular-shaped; wherein the protrusion comprises a first surface and a second surface; wherein the first surface faces in a direction parallel to the wall portion; wherein the second surface is generally perpendicular to the first surface; wherein said base comprises an annular-shaped cylindrical portion and an annular-shaped planar portion extending outwardly from the cylindrical portion; wherein the planar portion is generally flush with the first surface; and wherein the cylindrical portion is generally parallel with the second surface.

9. The vacuum interrupter of claim 8 wherein said shield member comprises an annular-shaped ledge; wherein the ledge is generally parallel with the planar portion; wherein the planar portion is generally flush with the ledge; and wherein the planar portion is disposed between the ledge and the first surface.

10. The vacuum interrupter of claim 6 wherein said shield member has a groove; wherein said at least one flexible arm comprises a claw portion and a bulge portion; wherein the claw portion extends into the groove; and wherein the bulge portion connects the claw portion to said base.

11. The vacuum interrupter of claim 10 wherein the protrusion is annular-shaped; wherein the protrusion comprises a first surface and a second surface; wherein the first surface faces in a direction parallel to the wall portion; wherein the second surface is generally perpendicular to the first surface; wherein the claw portion comprises a first leg, a second leg, and a third leg; wherein the first leg extends from the bulge portion; wherein the first leg is generally parallel with the second surface; wherein the second leg extends from the first leg away from said shield member; and wherein the third leg extends from the second leg into the groove of said shield member in order to retain said shield member on said ceramic member.

12. A method of assembling a vacuum interrupter, said vacuum interrupter including a tubular ceramic member, a tubular shield member having a central axis, a pair of separable contacts, and a retaining clip, said retaining clip comprising a base and at least one flexible arm extending from said base, said method comprising the steps of:
providing said ceramic member;
mounting said retaining clip on said ceramic member;
disposing said shield member internal with respect to said ceramic member;
pushing said shield member into said retaining clip in order to retain said shield member on said ceramic member, said base being mounted on said ceramic member, said at least one flexible arm engaging said shield member;
disposing said separable contacts internal with respect to said shield member; and
moving said at least one flexible arm away from the central axis during the pushing step.

13. The vacuum interrupter of claim 10 wherein the protrusion is annular-shaped; wherein the protrusion comprises a first surface and a second surface; wherein the first surface faces in a direction parallel to the wall portion; wherein the second surface is generally perpendicular to the first surface; wherein the bulge portion comprises a first leg, a second leg, and a third leg; wherein the first leg extends from said base; wherein the first leg is generally parallel with the second surface; wherein the second leg extends from the first leg away from said shield member; wherein the third leg extends from the second leg toward said shield member; and wherein the third leg is connected to the claw portion.

14. The method of claim 12 wherein said shield member has a groove; wherein said at least one flexible arm comprises a bulge portion and a claw portion; wherein the claw portion is spaced from said base; wherein the bulge portion connects the claw portion to said base; wherein the claw portion comprises a first leg, a second leg, and a third leg; wherein the first leg extends from the bulge portion; wherein the second leg connects the first leg to the third leg; and wherein the method further comprises the step of:
moving the third leg into the groove during the pushing step in order to retain said shield member on said ceramic member.

15. The method of claim 12 wherein said base is annular-shaped; and wherein the method further comprises the step of:
pushing said shield member partially through said base.

16. The method of claim 12 wherein said ceramic member comprises a wall portion and an annular-shaped protrusion extending inwardly from the wall portion; wherein said base is annular-shaped; and wherein the mounting step comprises:
overlaying said base on the protrusion.

17. The method of claim 16 wherein said shield member comprises an annular-shaped ledge; wherein said base comprises an annular-shaped cylindrical portion and an annular-shaped planar portion extending outwardly from the cylindrical portion; and wherein the pushing step comprises:
overlaying the ledge on the planar portion in order that the planar portion is generally flush with the ledge.

* * * * *